(12) United States Patent
Partridge et al.

(10) Patent No.: US 7,170,860 B2
(45) Date of Patent: Jan. 30, 2007

(54) METHOD AND SYSTEM FOR PASSIVELY ANALYZING COMMUNICATION DATA BASED ON FREQUENCY ANALYSIS OF ENCRYPTED DATA TRAFFIC, AND METHOD AND SYSTEM FOR DETERRING PASSIVE ANALYSIS OF COMMUNICATION DATA

(75) Inventors: Craig Partridge, East Lansing, MI (US); William Timothy Strayer, West Newton, MA (US); David Bruce Cousins, Barrington, RI (US)

(73) Assignee: BBN Technologies Corp., Cambridge, MA (US)

( * ) Notice: Subject to any disclaimer, the term of this patent is extended or adjusted under 35 U.S.C. 154(b) by 1242 days.

(21) Appl. No.: 10/167,620

(22) Filed: Oct. 19, 2001

(65) Prior Publication Data

US 2003/0097595 A1 May 22, 2003

Related U.S. Application Data

(60) Provisional application No. 60/242,598, filed on Oct. 23, 2000.

(51) Int. Cl.
*H04J 1/16* (2006.01)

(52) U.S. Cl. .............. 370/252; 370/210; 375/152; 379/88.17

(58) Field of Classification Search .......... 370/252, 370/352–356, 400, 401, 210; 375/147, 152; 379/88.17, 88.26

See application file for complete search history.

(56) References Cited

U.S. PATENT DOCUMENTS

| | | | | |
|---|---|---|---|---|
| 4,625,081 A | * | 11/1986 | Lotito et al. ............. | 379/88.26 |
| 5,838,919 A | | 11/1998 | Schwaller et al. .......... | 709/224 |
| 5,881,237 A | | 3/1999 | Schwaller et al. .......... | 709/224 |
| 6,484,203 B1 | | 11/2002 | Porras et al. ............... | 709/224 |
| 6,519,703 B1 | | 2/2003 | Joyce .......................... | 726/22 |
| 6,546,017 B1 | | 4/2003 | Khaunte ..................... | 370/412 |
| 6,597,661 B1 | | 7/2003 | Bonn .......................... | 370/235 |
| 6,700,895 B1 | | 3/2004 | Kroll .......................... | 370/412 |
| 6,718,395 B1 | | 4/2004 | Ziegler ....................... | 709/248 |
| 6,958,977 B1 | | 10/2005 | Mitrani et al. ............. | 370/252 |

(Continued)

OTHER PUBLICATIONS

Abry et al., "Multiscale Nature of Network traffic," IEEE Signal Processing Magazine, pp. 28-46, (2002).

(Continued)

*Primary Examiner*—John Pezzlo
(74) *Attorney, Agent, or Firm*—Fish & Neave IP Group Ropes & Gray LLP

(57) ABSTRACT

A system for passively analyzing an aggregation of communication signals simultaneously passing through a network link performs spectral analysis on a trace of communication traffic through the network link. The spectral analysis identifies period components of the trace corresponding to different communication signals. A system for deterring the passive analysis of signals aggregates communication traffic through a network link, such that a plurality of signals simultaneously pass through the network link. The plurality of signals is regulated such that the data packets corresponding to the plurality of signals leave the network link at a common rate. A memory temporarily stores the data packets as they enter the network link, and a timer maintains a fixed time interval for releasing the data packets from the memory.

36 Claims, 7 Drawing Sheets

U.S. PATENT DOCUMENTS

| | | | |
|---|---|---|---|
| 6,981,158 B1 | 12/2005 | Sanchez et al. | 726/2 |
| 2002/0032871 A1 | 3/2002 | Malan et al. | 726/23 |
| 2002/0112060 A1 | 8/2002 | Kato | 709/227 |
| 2002/0150102 A1 | 10/2002 | Janko et al. | 370/392 |

OTHER PUBLICATIONS

Boufaden et al., "Topic Segmentation: A First Stage to Dialog-Based Information Extraction," Department of Computer Science and Operations Research, University of Montreal, Quebec, Canada, 7 pages.

Cappe et al., "Long-Range Dependence and Heavy-Tail Modeling for Teletraffic Data," IEEE Signal Processing Magazine, pp. 14-27, (2002).

Hazen et al., "Recent Improvements in an Approach to Segment-Based Automatic Language identification" Spoken Language Systems Group, Laboratory for Computer Science, Massachusetts Institute of Technology, Cambridge, MA, 4 pages.

Ramus et al., "Language Identification with Suprasegmental Cues: A Study based on Speech Resynthesis," Journal of the Acoustical Society of America, 105(1):512-521, (1999).

Savage et al., "Practical Network Support for IP Traceback," Department of Computer Science and Engineering, University of Washington, Seattle, WA, 12 pages.

Schwartz et al., "Smart Packets: Applying Active Networks to Network Management," ACM Transaction on Computer Systems, 18(1):67-88, (2000).

Co-pending U.S. Appl. No. 09/881,145, filed Jun. 14, 2001.

Co-pending U.S. Appl. No. 10/044,073, filed Jan. 11, 2002.

Tagliaferri et al., Hybrid Neural Networks for Frequency Estimation of Unevenly Sampled Data, IEEE, pp. 975-979, (1999).

A.K. Parekh, "A Generalized Processor Sharing Approach To Flow Control In Integrated Services Networks", MIT Ph.D. thesis, Feb. 1992.

J.S. Turner, "New Directions In Communications (Or Which Way To The Information Age)", IEEE Communications Magazine, vol. 24, No. 10, Oct. 1986.

R. Guerin et al., "A Unified Approach To Bandwidth Allocation And Access Control In Fast Packet-Switched Networks", IEEE INFOCOM, 1992.

S.M. Kay, *Modern Spectral Estimation: Theory & Application*, Prentice Hall, 1988.

C. Partridge, *Gigabit Networking*, Addison-Wesley, 1994.

A.V. Oppenheim et al., *Discrete-Time Signal Processing*, Prentice Hall, 1989.

\* cited by examiner

METHOD AND SYSTEM FOR PASSIVELY ANALYZING COMMUNICATION DATA BASED ON FREQUENCY ANALYSIS OF ENCRYPTED DATA TRAFFIC, AND METHOD AND SYSTEM FOR DETERRING PASSIVE ANALYSIS OF COMMUNICATION DATA

CROSS-REFERENCE TO RELATED APPLICATION

The present application claims benefit of U.S. Provisional Application No. 60/242,598 filed on Oct. 23, 2000, the entire contents of which is incorporated herein by reference.

BACKGROUND OF THE INVENTION

1. Field of the Invention

The present invention relates generally to a method and system for detecting an encrypted data signal and for ensuring that an encrypted data signal is securely transmitted. More particularly, the present invention relates to the use of frequency analysis techniques to process an encrypted data signal, to detect the presence and characteristics of the signal as well as to minimize its detectability. That is, the present invention provides techniques for detecting and analyzing an encrypted data signal, and also provides techniques for minimizing the detectability of an encrypted data signal.

2. Related Art

How information is exchanged underwent major changes in the latter part of the Twentieth Century, and many of the changes can be attributed to the use of digital signals to store and send data. Today, it is common to transmit information over public communication networks, such as public switched telephone networks and other data networks. Examples of this include the prevalent use of electronic mail to communicate messages between parties, and the sharing of information in other ways via the Internet.

Because of the public nature of communication networks such as the Internet, there is concern that the integrity of sensitive information may be compromised by those who intrude on a transmission without permission. Such sensitive information may include credit card information, banking information, confidential corporate information, and information relating to the trading of securities, for example. Fear of having their private information accessed by an unauthorized party has caused some to refrain from participating in "on-line" shopping and "on-line" banking, and has hindered a more widespread use of public communication networks for transmission of sensitive information. This has led some corporate entities to invest large sums of money to continuously improve the security of their information transmissions.

There are two major types of security attacks on digital transmissions that can occur: active attacks and passive attacks. An active attack is one in which a data stream is modified or interrupted by an intruder, or a false data stream is created by an intruder. Examples of active attacks include the unauthorized alteration of information available from a site on the World Wide Web (Web), and the unauthorized prevention of access to information from a Web site. It should be understood that intruders need not be actual persons, but may be so-called software viruses and worms.

In contrast, a passive attack is one in which a transmission is monitored but is not altered, and is akin to eavesdropping. One type of passive attack relates to the unauthorized access by an intruder to confidential transmissions. Examples of such access include the unauthorized reading of electronic mail and the unauthorized access to transmissions relating to sensitive financial transactions, such as computerized securities trading.

Another type of passive attack relates to traffic analysis, in which transmission traffic is analyzed by an intruder to extract information about the transmissions themselves, as well as information about the communicating parties. Such information includes the location and identity of the communicating parties, and how long and how frequent the transmissions are. Analysis of transmission traffic may be used by an intruder to deduce what the transmissions pertain to, without directly accessing any of the transmissions themselves.

For example, it has been said that one can tell when the Pentagon is planning a military operation by tracking the number of pizza deliveries to its facilities. Similarly, it has been said that some law firms leave their office lights on all the time, to prevent anyone from monitoring when their lawyers are working unusually long hours, which could indicate that they may be involved in preparing for an important matter for their known corporate clients, perhaps indicating that it is a good time to buy or sell that company's stock. Although the above examples do not involve the transmission of information over a communication network, it is not difficult to imagine an example in which an intruder monitors the traffic of transmissions from a large brokerage firm in an effort to obtain information on trends in the stock markets.

On the other hand, there are many occasions in which it is desirable to be able to detect communications between parties, without actually "eavesdropping" or directly accessing the communications or modifying the communications in any way. For example, law enforcement agencies may want to confirm that a relationship exists between particular parties, by showing that those parties have communicated with each other via the Internet, without actually "tapping the line," which generally requires a warrant.

The present invention relates to passive attacks and provides techniques for performing traffic analysis of encrypted Internet transmissions to determine characteristics of the transmissions, such as the locations of the communicating parties. The present invention also provides countermeasures to the unauthorized traffic analysis of encrypted Internet transmissions.

Basically, the Internet is a packet-switched network. The most common protocols used by computers and networks to communicate with one another via the Internet are the Transmission Control Protocol (TCP) and the Internet Protocol (IP), commonly known as TCP/IP. TCP breaks down a transmission into packets at the sending end and reassembles the packets at the receiving end. IP ensures that the packets are sent to the right destination.

Generally, software called a TCP/IP stack is required to access the Internet. Diagrams illustrating the location of security features at various levels in a TCP/IP stack are shown in FIGS. 1(a)–1(c).

A number of different approaches have been used to achieve different degrees of communication security on the Internet. One approach is to implement security at the application level, as shown in FIG. 1(c), so that specific security measures are embedded within a particular application. Examples of this approach include the Secure Electronic Transaction (SET), which is a set of security protocols designed to protect credit-card transactions; the Secure Multi-purpose Internet Mail Extension (S/MIME) and Pretty Good Privacy (PGP) protocols, which are designed to protect electronic mail; and Kerberos, which is a set of authentication protocols designed to ensure authorized access to service applications. An advantage of application-level security is that it can be tailored to the needs of each application. However, one disadvantage of implementing security measures at the application level is that separate protocols must be developed for each application.

Another approach is to implement security at the transport level, in a layer just above the TCP layer, as shown in FIG. 1(b). For example, a measure of Web security may be obtained by using the Secure Sockets Layer (SSL) set of protocols. One advantage of transport-level security is that is operates on the transport of data, regardless of the application being used.

In order to implement security at the network level, or at the IP layer shown in FIG. 1(a), a set of protocols known as IP Security (IPsec) has been developed IPsec is capable of encrypting and/or authenticating all traffic at the IP layer, packet by packet, and may include a filtering function so that only selected packets are subjected to IPsec processing. An advantage of IPsec is that it is transparent to end users and applications. Details regarding the implementation of IPsec in a network are known to those involved in network security and, thus, will be omitted herein.

Passive attacks generally are difficult to detect, because the intended recipient of a transmission receives the transmitted information uncorrupted. Therefore, instead of combating passive attacks through detection, efforts are usually directed to their prevention. The most commonly-used preventive technique is encryption.

Encryption deals with the transformation of data, according to an algorithm, into a state that is difficult to decipher without knowing the decryption procedure, or key(s). That is, even if the algorithm is known, the encrypted data would be difficult to decipher without knowing at least one key. A diagram illustrating conventional encryption is shown in FIG. 2.

As mentioned above, encryption can be implemented at a number of different layers of a TCP/IP stack: the application level, the transport level, and the network level. For example, one can encrypt the individual packets, each link in the transmission path, or the application data. The different layers have different associated encryption costs. Encrypting every link means that a private network must be kept completely disjoint from the public networks that do not encrypt their links. An application-level approach requires each application to provide its own means of security. For these reasons, much attention has been focussed on encryption of individual packets using IPsec.

Notwithstanding the advances that have been made in encryption technology, traffic analysis can be performed on a single encrypted communication to determine what application was used for that communication. Thus, encryption alone is insufficient to prevent traffic analysis.

One method proposed to remedy this problem is to aggregate, or mix, multiple traffic streams over a single security association between two points. It is generally believed that, for aggregated traffic, IPsec would provide communication privacy that largely is immune to traffic analysis. However, as the discussion below will reveal, it is possible to undo the effects of aggregation and to identify individual conversations in the mix even when IPsec is implemented.

SUMMARY OF INVENTION

An object of the present invention is to provide a system for detecting patterns in encrypted IP traffic, in order to determine the vulnerabilities of the encrypted IP traffic.

Another object of the present invention is to provide a system for deterring passive attacks on transmissions across communication networks.

A further object of the present invention is provide a system that uses signal processing techniques to reveal patterns in encrypted IP traffic.

Yet another object of the present invention is to provide a system for determining the location of communicating parties by passively analyzing IP traffic.

Still another object of the present invention is to provide a system for masking patterns in encrypted IP traffic, as a defense against the extraction of confidential/sensitive information from the patterns.

Yet another object of the present invention is to provide a system for masking packet arrival times and traffic flow shapes of encrypted IP traffic, to make it difficult to determine what applications are being used by the communicating parties over an encrypted link, and who the parties are, if the encrypted IP traffic is subjected to traffic analysis.

According to the invention, information regarding the location of communicating parties is obtained from an encrypted stream of IP traffic by analyzing the stream of IP traffic stream using, for example, cepstral analysis techniques, wavelet analysis techniques, and Hidden Markov Models. Results of the analysis can yield patterns in the traffic stream, which, in turn, can be used to determine the location of the communicating parties sending the data packets. The invention also provides a system for preserving the confidentiality of communication signals by reshaping them to minimize the presence of detectable patterns.

According to one aspect, the present invention provides an apparatus for analyzing signals in a trace of communication traffic through a network link. The trace corresponds to the arrival times of at least a first packet stream a second packet stream simultaneously passing through the network link, with the first and second packet streams respectively corresponding to first and second communications. A spectrum analyzer performs cepstral analysis of the trace, and identifies the periodic components of the signals corresponding to the first and second communications.

According to another aspect of the present invention, patterns are detected in a trace of communication traffic through a network link by performing wavelet analysis to analyze the periodic components in the trace.

In yet another aspect of the present invention, shapes are detected in a trace of communication traffic through a network link using Hidden Markov Models. Shapes in the trace are differentiated by training statistical models on a data set of a shape of the trace, comparing a training score for each of the statistical models with one another, and classifying the shape according to a statistical model with a highest training score.

In still another aspect of the present invention, passive analysis of a plurality of signals that simultaneously pass through a network link is deterred by temporarily storing data packets entering the network link in a memory, and maintaining a fixed time interval for releasing the data packets from the memory. The data packets corresponding to the plurality of signals passing through the network link are thus regulated to leave the network link at a common rate.

According to one embodiment, a method of analyzing aggregated signals in a trace of communication traffic is provided. The method includes the steps of: (i) obtaining a trace of communication traffic through a network link, the trace corresponding to the arrival times of at least a first packet stream and a second packet stream simultaneously passing through the network link, with the first and second packet streams respectively corresponding to first and second communications; (ii) performing cepstral analysis on the trace; and (iii) identifying periodic components in the signals corresponding to the first and second communications.

According to another embodiment, a method for deterring separation of aggregated signals in network communications is provided. The method includes the steps of: (i) aggregating communication traffic through a network link, such that a plurality of signals simultaneously pass through the network link, wherein the plurality of signals are comprised of respective series of data packets; and (ii) regulating the plurality of signals through the network link, such that the series of data packets corresponding to the plurality of signals leaves the network link at a common rate. The regulating step utilizes a memory, which temporarily stores data packets entering the network link, and a timer, which maintains a fixed time interval for releasing the data packets from the memory.

In another embodiment, a programmable computer for use in analyzing aggregated signals in a trace of communication traffic is provided. The programmable computer includes a memory with at least one region for storing computer-executable program code, and a processor for executing the program code stored in the memory. The program code includes code for performing cepstral analysis on a trace of communication traffic through a network link. The trace corresponds to the arrival times of at least a first packet stream and a second packet stream simultaneously passing through the network link, with the first and second packet streams respectively corresponding to first and second communications. The cepstral analysis identifies periodic components in the signals corresponding to the first and second communications.

In yet another embodiment, a programmable computer for use in deterring separation of aggregated signals in network communications is provided. The programmable computer includes a memory with at least one region adapted to store computer executable program code, and a processor adapted to execute the program code stored in the memory. The program code includes: (i) code for aggregating communication traffic through a network link, such that a plurality of signals simultaneously pass through the network link, wherein the plurality of signals are comprised of respective series of data packets; and (ii) code for regulating the plurality of signals through the network link, such that the series of data packets corresponding to the plurality of signals leaves the network link at a common rate. The code for regulating controls a memory, which temporarily stores data packets entering the network link, and a timer, which maintains a fixed time interval for releasing the data packets from the memory.

In still another embodiment, a computer-executable program stored on a computer-readable medium is provided. The program operates to analyze aggregated signals in a trace of communications traffic. The program includes code for performing cepstral analysis on a trace of communication traffic through a network link. The trace corresponds to the arrival times of at least a first packet stream and a second packet stream simultaneously passing through the network link, with the first and second packet streams respectively corresponding to first an second communications. The cepstral analysis identifies the periodic components in the signal corresponding to the first and second communications.

In another embodiment, A computer-executable program stored on a computer-readable medium is provided. The program operates to deter separation of aggregated signals in network communications. The program includes: (i) code for aggregating communication traffic through a network link, such that a plurality of signals simultaneously pass through the network link, wherein the plurality of signals are comprised of respective series of data packets; and (ii) code for regulating the plurality of signals through the network link, such that the series of data packets corresponding to the plurality of signals leaves the network link at a common rate. The code for regulating controls a memory, which temporarily stores data packets entering the network link, and a timer, which maintains a fixed time interval for releasing the data packets from the memory.

In still another embodiment, an apparatus for analyzing aggregated signals in a trace of communication traffic through a network link is provided. The trace corresponds to the arrival times of at least a first packet stream and a second packet stream simultaneously passing through the network link, with the first and second packet streams respectively corresponding to first and second communications. The apparatus includes cepstral analysis means for identifying periodic components in the signals corresponding to the first and second communications.

In yet another embodiment, an apparatus for deterring separation of a plurality of signals that simultaneously pass through a network link includes: (i) memory means for temporarily storing data packets entering the network link; and (ii) timing means for maintaining a fixed time interval for releasing the data packets from the memory means. The series of data packets corresponding to the plurality of signals passing through the network link is regulated to leave the network link at a common rate.

These and other objects, features, and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIG. 1(b) corresponding to the transport level; and

FIG. 1(c) corresponding to the application level.

DETAILED DESCRIPTION OF THE PREFERRED EMBODIMENTS

Figure 1A:
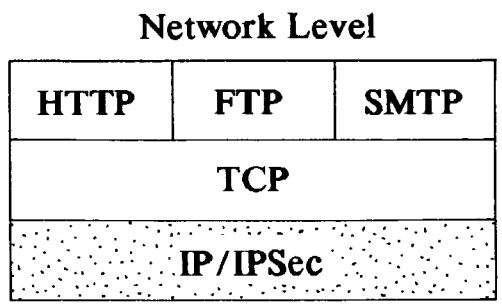
FIGS. 1(a)–1(c) illustrate the relative locations of security features in a TCP/IP stack, with FIG. 1(a) corresponding to the network level.
Figure 1B:
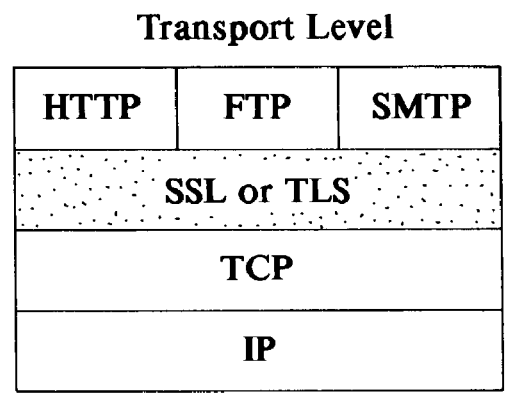
Figure 1C:
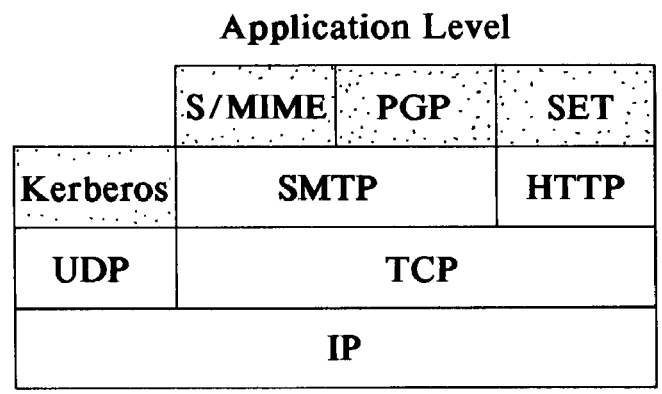
Figure 2:
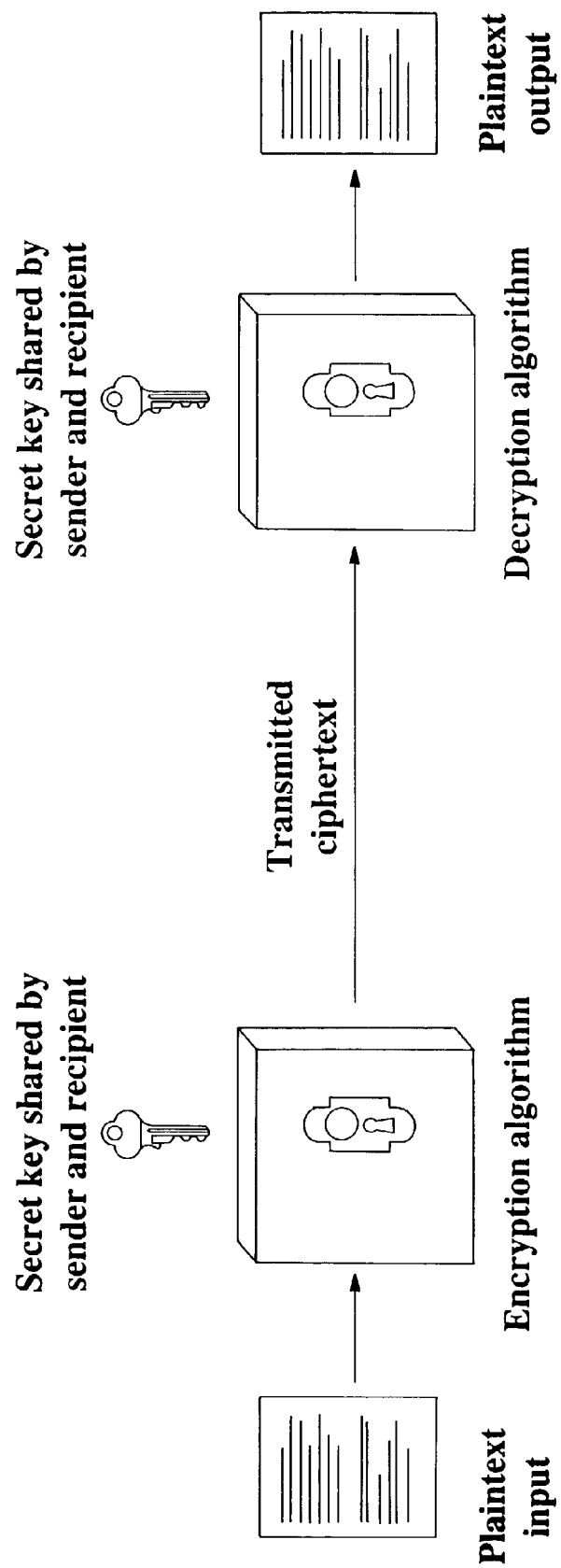
FIG. 2 illustrates a conventional encryption scheme that uses one or more keys.

Signal processing techniques developed for sonar and submarine acoustics and for speech recognition can be used to perform valuable traffic analysis on security associations containing IPsec-encrypted data from multiple traffic streams, that is, aggregated traffic streams. In particular, signal processing techniques can be used to identify individual traffic streams from the aggregate, and, in some cases, identify where each stream originates and terminates behind security gateways implementing IPsec.

Prior to the present invention, the only use of signal processing techniques to analyze the shape of IP traffic has been the use of frequency analysis to study TCP round-trip times. One reason that signal processing techniques generally have not been used is that the data-communications curricula of colleges and universities emphasize queuing theory rather than signal processing as a method for analyzing data traffic. Thus, the concept of applying digital signal processing (DSP) techniques, most notably spectral analysis, to the traces of TCP/IP traffic is novel. The following discussion deals with how to apply signal processing techniques to traffic traces.

Internet applications and protocols have distinctive transmission patterns, or shapes, that can be used to detect them, even after the data transmissions, or traffic, have been encrypted. The shapes result from features such as packet sizes, packet arrival times, and transmission intervals. Packet sizes can be masked using IPsec, because IPsec contains options to pad packet lengths to mask their true sizes. Masking packet arrival times and transmission intervals, however, is harder to accomplish. To date, there has been no attempt to conceal these traffic features of IP traffic.

A trace of IP traffic listing the size of each packet transmitted and timestamps of when each packet was seen enables an intelligent observer to determine what applications were used to transmit those packets, because the applications' individual protocols have identifying characteristics. For example, a bulk transfer of information is characterized by a stream of large packets sent in one direction, with corresponding fixed-size acknowledgments, such as 40-byte acknowledgments, sent in the opposite direction. In contrast, an interactive communication shows more variability than a bulk transfer, because an interactive communication involves variable-sized packets, corresponding to a user's keystrokes, being sent in one direction, and variable-sized packets being sent in the opposite direction in response.

Traffic analysis can be performed by observing only the timestamps of the transmitted packets. For example, if a bulk transfer is compared with an interactive communication, and both are transmitted concurrently over a security association, or link, frequency analysis performed on the intervals between packets will reveal two different timing frequencies. The bulk transfer will show a characteristic frequency that is essentially the inverse of its round-trip time. This characteristic frequency results from the receiving end of the bulk transfer transmitting an acknowledgment to the sending end for each packet or group of packets received, thus prompting the sending end to transmit a new packet or group of packets in response. Since there is almost always more data ready to be sent, the send-receive-acknowledge protocol of a bulk transfer gives rise to a regular transmission pattern.

On the other hand, an interactive communication will show a highly variable round-trip time that reflects not only the packet round-trip time but also the responder's thinking time, which is a process that follows the well-known Poisson probability distribution. Therefore, in the present example, an analysis of just a trace of the timestamps of transmitted packets can enable an observer to determine that the trace corresponds to both a bulk transfer and an interactive communication occurring simultaneously over the link.

A trace of IP traffic can be analyzed using cepstral analysis. This technique is most commonly associated with speech signal processing, but has also been used to analyze seismic signals. The following is a brief description of cepstral analysis, and demonstrates how this technique can be used to separate various components of IP traffic.

Consider a signal x(t), composed of two periodic signals a(t) and b(t). The spectrum of x(t), $X(\omega)$, varies as a function of frequency, or $\omega$. Assume that $X(\omega)$ is a composite of a first spectrum, $A(\omega)$, and a second spectrum, $B(\omega)$, corresponding to signals A and B, respectively. Using a multiplicative model of the two spectra, $A(\omega)$ and $B(\omega)$, the spectral magnitude can be written as $$|X(\omega)| = |A(\omega)||B(\omega)|. \qquad \text{Eqn. 1}$$

The logarithm of Eqn. 1 is the linear equation $$\log|X(\omega)| = \log|A(\omega)| + \log|B(\omega)|. \qquad \text{Eqn. 2}$$

A graphical representation of Eqn. 2 is commonly referred to as a log-magnitude plot. The Fourier transform of the left-hand-side of Eqn. 2 is the cepstrum of X, given by $$c(n) = \frac{1}{2\pi}\int_{-\pi}^{\pi} \log|X(\omega)| e^{j\omega n} d\omega, \qquad \text{Eqn. 3}$$

where n is the order of the cepstral component. Usually, Fast Fourier Transform (FFT) techniques are used to determine c(n).

Figure 3A:
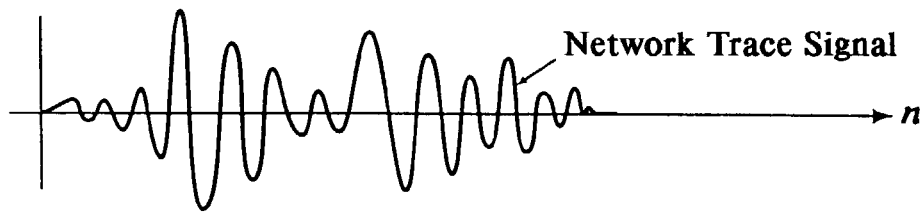
FIGS. 3(a)–3(d) are plots summarizing cepstral analysis.
Figure 3B:
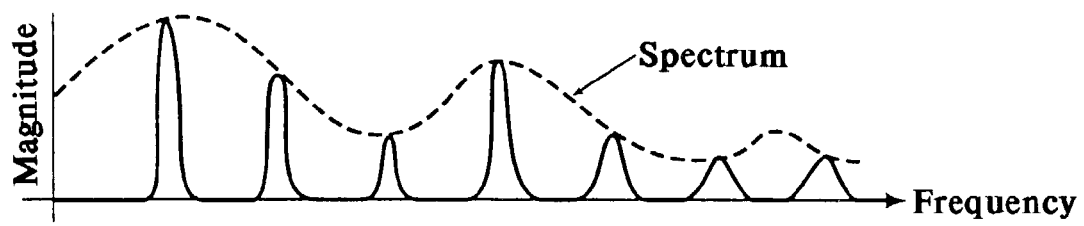
Figure 3C:
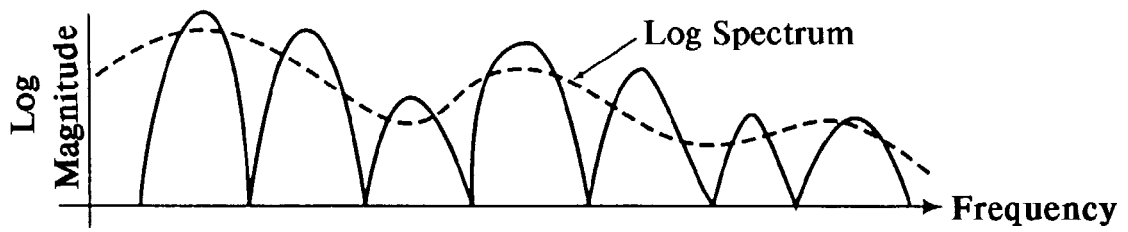
Figure 3D:
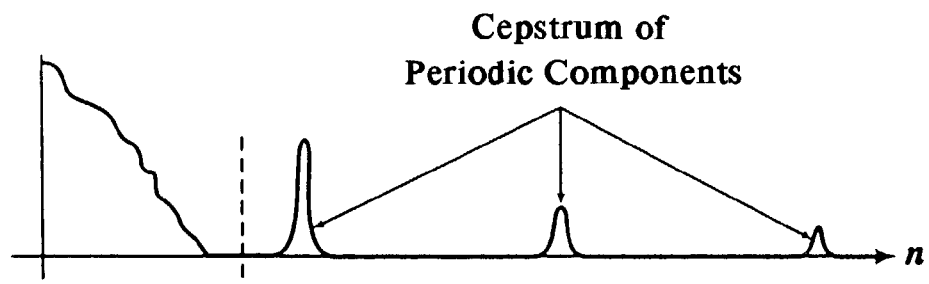
Figure 4:
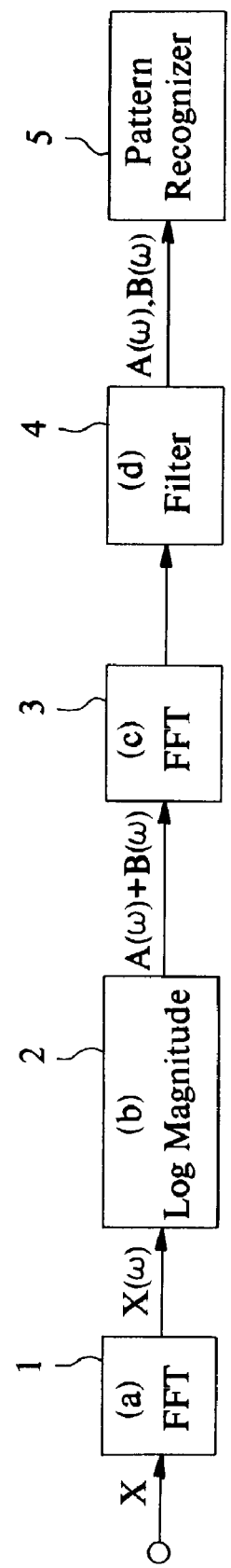
FIG. 4 schematically shows an apparatus for performing cepstral analysis.

FIGS. 3(a) to 3(d) summarize cepstral analysis, and FIG. 4 schematically depicts an apparatus for performing cepstral analysis. FIG. 3(a) shows an aggregated signal X as a function of n, which is a time parameter, and FIG. 3(b) shows the Fourier transform of X, with the spectral envelope of X shown by the dashed line. The logarithm of the Fourier transform of X is shown in FIG. 3(c), with the spectral envelope superimposed. The cepstrum of X, or the Fourier transform of the log-magnitude plot of FIG. 3(c), is shown in FIG. 3(d).

The cepstrum has large discrete values that correspond to periodic patterns in the input signals a(t) and b(t). Therefore, cepstral analysis can be used to identify the contributions to x(t) from a(t) and b(t).

Historically, the signal processing community has been interested in two types of signals: periodic signals, which are characterized by intrinsic repetitions, and transient signals, which are characterized by perturbations that occur over a small time interval. Periodic waveforms (signals) are best analyzed by Fourier techniques. With this class of techniques, a signal is decomposed into its sinusoidal spectral components. Thus, signals that are fundamentally periodic (sinusoidal) tend to result in identifiable spectral lines. This characteristic is also widely used to identify very low level signals in the presence of additive noise. If the noise is random and does not contain periodic components, then its energy is diffused through the spectrum, whereas the energy of the signal itself is focused in one spectral bin.

Standard Fast Fourier Transformation (FFT) analysis can be applied to a stream of data, or trace, representing the traffic of TCP/IP streams to extract patterns, or traffic shapes, that characterize the data. The detection of traffic shapes is somewhat complicated, and is essentially a three-part problem. The first part is to find a signal representation of the raw IP traffic, or the trace, that can lend itself to manipulation by signal-processing algorithms. The second part is to develop an analysis function that will extract from the trace the desired information about traffic shapes, where the analysis function is in an easily manipulated form. The second part is closely related to the choices made in the first part, and both parts are likely to undergo optimization through repeated iteration. Finally, the third part is to detect the signatures of the traffic shapes in the presence of extraneous data, or noise.

In regard to the first part, the identifiable information of the shape of a TCP/IP transmission can be represented by a signal representation in the form of $$y[n] = \sum_{i=0}^{Npackets-1} \partial[n - t_i],$$ Eqn. 4 where $\partial[n-t_i]$ is the Dirac delta (impulse) function, and $t_i$ is the arrival time of the packet. The signal of Eqn. 4 can be manipulated using spectral techniques.

Note that Eqn. 4 does not take into account other information that may be available, such as packet size, for example. Such additional information may be taken in consideration when encoding the packets, such as encoding the time duration of the transmitted pulses, as well as when decoding a transmission, such as in a parameter for further differentiating the shapes of the different data streams from one another.

Figure 5A:
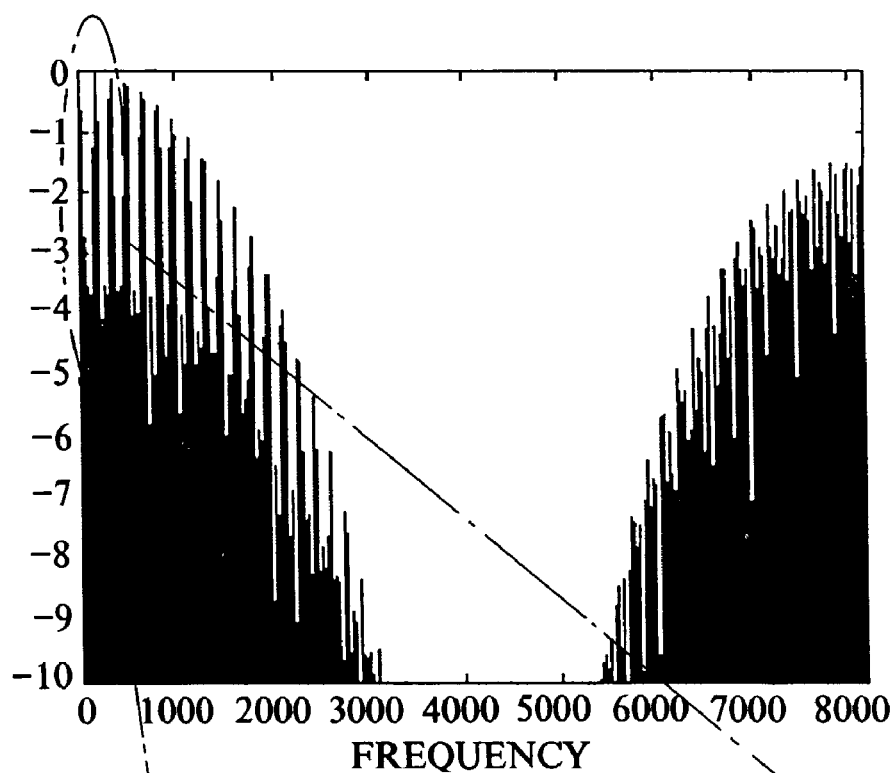
FIG. 5(a) shows a FFT spectrum of a trace of IP traffic.

If a straight FFT is applied to a signal representation of a trace of IP traffic, the resulting spectrum looks like FIG. 5(a). Although a trained eye can see that there is an intrinsic pattern to the spectrum, because its level oscillates with a distinct period, the pattern is masked by the overall complexity of the spectrum. This complexity, or large bandwidth, results from the fact that the arrival times of packets are represented by impulse functions. Pulse trains of impulse functions have very wide bandwidths because they are of very limited time duration. Thus, their spectra are quite broad (and messy). However, the information of interest is the periodicity of the train of pulses, which is indicated by repetitions in spectral lines, also known as harmonics, and not just the lines themselves.

Figure 5B:
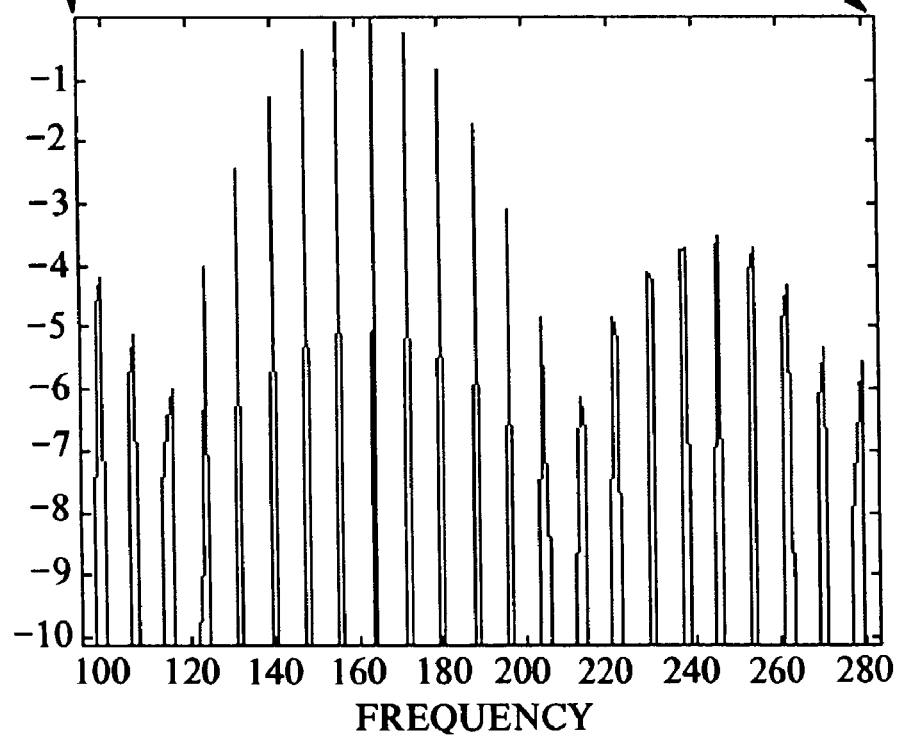
FIG. 5(b) shows an enlargement of a portion of the spectrum of FIG. 5(a).
Figure 6A:
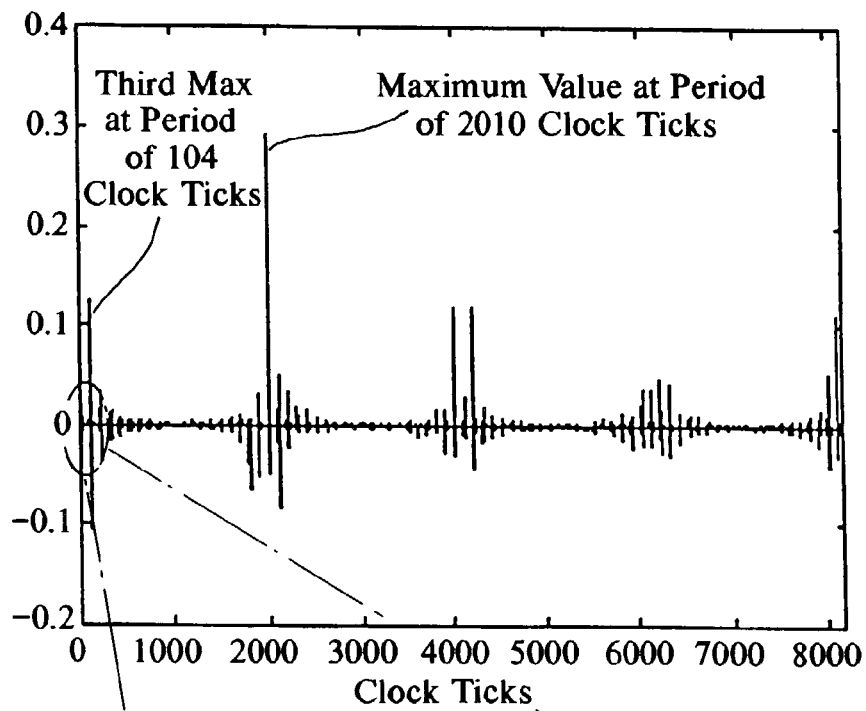
FIG. 6(a) shows a cepstrum of the spectrum of FIG. 5(a)

FIG. 5(b) is an enlargement of a small portion of the spectrum of FIG. 5(a), showing its periodicity. FIG. 6(a) shows the cepstrum of the spectrum of FIG. 5(a), and represents packet-arrival data for the IP traffic. That is, given only the packet arrival times from the signal of the IP traffic, cepstral analysis was used to extract a packet-arrival periodicity from the data.

Figure 6B:
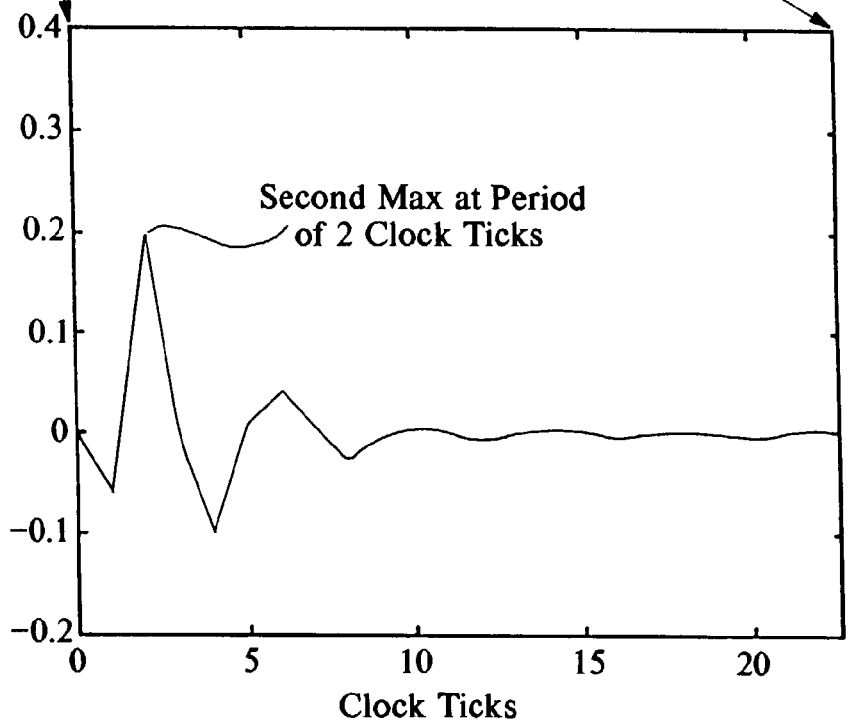
FIG. 6(b) shows an enlargement of a portion of the cepstrum of FIG. 6(a).

The cepstrum of FIG. 6(a) reveals several items of information about the IP traffic. A round-trip time of approximately 2010 seconds is indicated by the peak in the graph at 2010 clock ticks. FIG. 6(b), which is an enlargement of the leftmost portion of FIG. 6(a), shows an average time between when a packet is received and when it is acknowledged of 2 seconds, as indicated by the peak in the graph at 2 clock ticks. Another peak at around 104 clock ticks is likely the result of delayed TCP acknowledgments.

By performing the above cepstral analysis, an observer can make a reasonably good guess as to the location of the communicating parties. The interval of 2 clock ticks indicates that one endpoint of the communication is very close to the observation point. By using the speed of light to estimate the distance from the observation point, a guess can be made as to the minimum distance that end must be from the observation point. If information about the topology of where the endpoint lies is available, then the observer has sufficient information to identify which machine corresponds to the endpoint.

Thus, the above discussion demonstrates that standard techniques for encrypting IP traffic, including concealing the original packet sizes by padding them (as done by IPsec), do not provide adequate protection against traffic analysis based on observed packet arrival times.

Exactly how vulnerable aggregated encrypted traffic is to traffic analysis is not known and apparently has not been studied prior to the investigation resulting in the present invention. The above example shows that even when information is encrypted and the original packet sizes are masked with padding, traffic analysis based on packet arrival times can be used to determine the location of the sender and the receiver, and, thus, to guess the identities of the communicating parties.

The above examples deal with the case of a transfer of information between two parties. However, as mentioned earlier, the trend is to deter traffic analysis by aggregating traffic from multiple transmissions and then sending the aggregated traffic within one security association. In such a situation, an intruder does not know the contents of the transmitted packets, how many concurrent communications are taking place, or the final destination of any of the packets. The following discussion deals with ways to analyze aggregated traffic using detection theory originally developed for radar and sonar applications.

In addition to the applying spectral techniques, such as cepstral analysis, to IP traffic analysis, other techniques for characterizing signals by their transient as well as their periodic qualities include wavelet analysis and statistical analysis using Hidden Markov Models.

Wavelet analysis was developed in the 1980s as a way to analyze data over different time scales. That is, with wavelet analysis the same data can be simultaneously analyzed for small-scale features, such as the data/acknowledgment event doublets at a period of 2 clock ticks in FIG. 6(b), as well as for larger features, such as the overall 2010 clock tick period of FIG. 6(a). The periodicity of the trace, or signal, of IP traffic is readily observable through cepstral analysis, as discussed above. However, the range of scales in the trace, on the order of $10^4$ or higher, complicates the use of other spectral techniques.

Wavelet techniques can be used to analyze IP traffic with different scale settings, allowing fine, transient detail characteristics to be observed simultaneously with longer time-duration characteristics. Presently, wavelet analysis packages are readily available in commercial products such as Matlab®.

Wavelet analysis decomposes a time series into time-frequency space, so that the dominant modes of variability can be determined, as well as how those modes vary with time. The steps involved in wavelet analysis are known and may include the following:

1. Find a spectral transform of the time series.
2. Choose a wavelet function and a set of scales to analyze the spectral transform.

3. Construct a normalized wavelet function for each scale.
4. Find a wavelet transform for each scale.
5. Determine a "cone of influence" and a Fourier wavelength at each scale.
6. Plot a wavelet power spectrum, e.g., a graph of scale as a function of time.
7. Assume a background Fourier power spectrum at each scale, and use a chi-squared statistical technique to find a confidence (statistical significance) contour.

In the first step, a continuous spectral transform or a discrete spectral transform of a trace of IP traffic is obtained. Although the following describes the use of a continuous spectral transform, it is to be understood that the description is adaptable to the use of a discrete spectral transform. In the continuous case, Fourier transformation can be performed on a sliding segment of the trace of time length T, with the trace having a time step of $\delta t$ and a total length of $N\delta t$. This gives frequencies from $T^{-1}$ to $(2\delta t)^{-1}$. In the discrete case, the trace is transformed into a sequence of vectors of scale n. Naturally, the discrete case converges with the continuous case for large n.

In the second step, a wavelet function, $\psi_0(\eta)$, is chosen, where $\eta$ is a non-dimensional time parameter. To be a usable wavelet function, the function must have a zero mean and must be localized in both time and frequency space. For example, the Morlet wavelet may be used:

$$\psi_0(\eta) = \pi^{-1/4} e^{i\omega_0 \eta} e^{-\eta^2/2}, \quad \text{Eqn. 5}$$

where $\omega_0$ is a non-dimensional frequency.

The continuous wavelet transform of a discrete sequence $x_n$ is defined as the convolution of xn with a scaled and translated version of $\psi_0(\eta)$:

$$W_n(s) = \sum_{n'=0}^{N-1} x_n \cdot \psi^* \left[ \frac{(n'-n)dt}{s} \right], \quad \text{Eqn. 6}$$

where the "*" indicates the complex conjugate and s is the wavelet scale. By varying the wavelet scale s and translating along n, the localized time index, a picture can be constructed showing both the amplitude of any features versus the scale, as well as how the amplitude varies with time. The subscript 0 on $\psi$ has been dropped to indicate that $\psi$ has also been normalized.

To approximate the continuous wavelet transform, the convolution (Eqn. 6) should be done N times for each scale, where N is the number of points in the time series. By choosing N points, the convolution theorem allows us do all N convolutions simultaneously in Fourier space using a discrete Fourier transform (DFT). The DFT of $x_n$ is $$\hat{x}_k = \frac{1}{N} \sum_{n=0}^{N-1} x_n e^{-2\pi i k n/N}, \quad \text{Eqn. 7}$$

where k=0 . . . N−1 is the frequency index. In the continuous limit, the Fourier transform of a function $\psi(t/s)$ is given by $\hat{\psi}(s\omega)$. By the convolution theorem, the wavelet transform is the inverse Fourier transform of the product:

$$W_n(s) = \sum_{k=0}^{N-1} \hat{x}_k \hat{\psi}^*(s\omega_k) e^{i\omega_k n \delta t}, \quad \text{Eqn. 8}$$

where the angular frequency is defined as $$\omega_k = \begin{cases} \frac{2\pi k}{N \delta t} : k \leq \frac{N}{2} \\ \frac{2\pi k}{N \delta t} : k > \frac{N}{2} \end{cases}. \quad \text{Eqn. 9}$$

Using Eqn. 8 and a standard Fourier transform routine, the continuous wavelet transform can be calculated (for a givens) at all n simultaneously.

In the third step, it is ensured that the wavelet transforms (Eqn. 8) at each scale s are directly comparable to each other by normalizing the transform to have unit energy:

$$\hat{\psi}(s\omega_k) = \left( \frac{2\pi s}{\delta t} \right)^{1/2} \hat{\psi}_0(s\omega_k). \quad \text{Eqn. 10}$$

With the normalizations, each scale s has the number of data points N given by $$\sum_{k=0}^{N-1} |\hat{\psi}(s\omega_k)|^2 = N. \quad \text{Eqn. 11}$$

The fourth step is performed using Eqn. 8. In the fifth step, it is determined where "edge-effect" errors are important, such as the beginning and the end of the wavelet power spectrum, which is a combination of the real and imaginary parts of the wavelet transform $W_n(s)$, or $$|W_n(s)|^2, \quad \text{Eqn. 12}$$

and the edge-effect errors are taken into account so that there is a minimum impact on the wavelet power spectrum.

In the sixth step, the wavelet power spectrum is plotted as a contour plot. In the seventh step, a background level is assumed at each scale, and statistical methods, such as the chi-squared distribution, is used to determine the contour for a desired confidence level.

The wavelet transform is essentially a bandpass filter of a uniform shape and varying location and width. Therefore, it is possible to reconstruct the original time series by deconvolution or an inverse filter. This is straightforward for an orthogonal wavelet transform (which has an orthogonal basis), but for the continuous wavelet transform it is complicated by the redundancy in time and scale. However, this redundancy also makes it possible to reconstruct the time series using a completely different wavelet function, the easiest of which is a delta ($\delta$) function. In this case, the reconstructed time series is just the sum of the real part of the wavelet transform over all scales.

The filter can be used with a defined threshold of wavelet power, which serves to remove the low-amplitude (noise) regions of the wavelet transform. This type of filtering removes noise at all frequencies, and can be used to locate single events in a broad power spectrum or multiple events that have varying frequency.

Thus, the above discussions shows that wavelet analysis can be used to deconvolute a trace of aggregated IP traffic, so that contributions to the trace from individual communications can be separated. Wavelet analysis may be used to filter various shapes in the IP traffic, thus facilitating the identification of various types of communication, such as bulk transfers, interactive communications, acknowledgments, etc., for example, thereby also facilitating identification of the communicating parties.

Statistical techniques may be used to analyze IP traffic by using a Hidden Markov Model (HMM) signal representation. A HMM representation incorporates the temporal aspect of transmission events as well as higher order characteristics, such as packet size, of each event. HMMs have been used for pattern matching in speech and natural language processing, and for transient-signal classification for sonar acoustic processors.

A HMM can be considered a finite state machine, where transitions can occur between any two states, but in a probabilistic manner. For example, a model consists of states, a topology of connections between the states, and associated parameters, which are learned from examples in a training phase. Preferably, a generative model is used, wherein the states have outputs that are observed feature vectors. The probability density associated with the model is the probability density for the generation of the observed feature vectors in a sequence, which is estimated from training data.

Any known training procedure may be used. Training for statistical sequence systems generally entails:
1. using current parameters to estimate posterior probabilities for hidden variables; and
2. using the posterior probabilities to determine new parameters that maximize an expectation of an output.

For a Markov model, the probability density of the sequence is broken up into a combination of probability densities for the sub-sequences using a Markov assumption. The output of a Markov model is a deterministic event. For a HMM, the output is a probability density function. That is, for any observed output sequence, the generating state sequence of a HMM is hidden.

In the case of IP traffic, each state has a measurable output, which can be either deterministic or probabilistic, and the outputs are events that are logged in the trace of the IP traffic, either directly or by some easily generated statistic or feature of the data.

In the context of differentiating between shapes in a trace of IP traffic, a given HMM can be trained on a shape data set using a standard technique such as, for example, the Baum-Welch re-estimation technique. The trained HMM is then used to score unknown data sets using another standard technique such as, for example, the forward-backward procedure. That is, the Baum-Welch re-estimation technique is used to train a HMM model to a signal, and the forward-backward procedure is used to classify how well a trained HMM matches a new signal. In a classification context, several HMMs are each trained on a specific class of an unknown pattern, and the HMM that generates the highest score against the unknown pattern indicates the class of that pattern.

As discussed above, one problem in detecting traffic patterns is determining which peaks or shapes in a cepstrum are of interest. Because there is no a priori information about the probability of there being a real shape to detect, probability theory dictates that the best option is to use the Neyman-Pearson Lemma.

The Neyman-Pearson Lemma states that the optimum detector consists of comparing the value of a test statistic to a simple threshold. In such a case, there are two types of errors: Type 1 is a false alarm (FA), where an event detection is claimed even though there is no event there; and Type 2 is a miss, where an event fails to be detected. Unfortunately, the probability of FA cannot be reduced without increasing the probability of a miss. Adjusting an acceptable error threshold allows us to select a balance between these two errors.

The probability of detection is given as $$\text{Prob}\{D\} = 1 - \text{Prob}\{\text{Miss}\}. \qquad \text{Eqn. 13}$$

By fixing the false alarm probability (or rate), Prob{FA}, the probability of detection, Prob{D}, is maximized. A plot of Prob{D} vs. Prob{FA} as a function of the threshold is called a Receiver Operating Characteristic (ROC) Curve, and is the fundamental tool for tuning detection performance.

With spectral techniques, such as those discussed above, the statistic to be generated is the value in each cepstral bin, corresponding to shapes with a given average periodicity. The detector used compares the value in each bin to fixed threshold values, and determines a shape to be present if the threshold values are exceeded.

One approach to generating the threshold values for detecting a given shape periodicity, i.e., the detection threshold for one particular cepstral bin, is to assume there are K sets of "no shape present" event logs and L sets of "shape present" event logs.

First, the cepstral statistics of the bin in question are generated using the technique discussed above:
Compute T(k) for each "shape not present" trace, for k=1 . . . K; and
Compute T(l) for each "shape present" trace, for l=1 . . . L.

Second, as a function of the detection threshold, $\gamma$, the following is computed:

$$nfa(\gamma) = \sum_{k=1}^{K} T(k) \geq \gamma, \qquad \text{Eqn. 14}$$

where nfa($\gamma$) is the number of incorrectly detected "no shape present" events, or false alarms, and $$nd(\gamma) = \sum_{l=1}^{L} T(l) \geq \gamma, \qquad \text{Eqn. 15}$$

where nd($\gamma$) is the number of correctly detected "shape present" events.

If K and L are chosen to be sufficiently large, it is possible to make good estimates of Prob{FA} and Prob{D}. Note that the two probabilities are still functions of $\gamma$.

From the above calculations, there is enough information to generate a ROC curve for the detector. Various measures can be used to select the operating point, but the easiest to do initially is to fix Prob{FA} to an acceptable value, thus determining the resulting $\gamma$ and Prob{D}.

The above discussions deal with ways to analyze a trace of IP traffic, which may be used by law enforcement agencies and governmental investigative agencies to passively analyze the traffic of IP transmissions to obtain information regarding the transmissions and the communicating parties. Of more concern to the general public, however, is to be able to prevent the extraction of information, such as packet arrival times, from IP traffic.

One technique is referred to as "filling the channel," and thwarts traffic analysis by keeping the network channel busy all the time. That is, fake (dummy) IP traffic is transmitted when there is no real IP traffic present. Unfortunately, this technique only works on some types of networks. For instance, CSMA/CD networks and many wireless networks require a certain number of quiet periods for their media-access layer to work. The spacing of quiet times, which is necessary for those networks to properly function, can reveal information about the real IP traffic carried by those networks.

An alternative to keeping the channel filled is to deliberately shape the IP traffic over the network channel to make it more regular. The simplest way to think of reshaping IP traffic is to think in terms of a fluid model, in which a bucket of fixed size has a hole cut in its bottom. As fluid is poured into the bucket, the fluid flows out of the hole at a particular rate. If the bucket is filled too fast, the fluid will also spill over the top of the bucket. Fluid that spills over the top is equivalent to lost data. The rate and pattern by which the bucket is filled, e.g., by a continuous stream from a hose or by discrete containers, represent IP traffic arriving at a network channel. The size of the bucket represents the queue of data.

If the average rate at which fluid is poured into the bucket is measured, and a hole is cut in the bucket such that fluid always drains from the bucket at the measured rate, then, regardless of the pattern-of filling the bucket, there is always a finite bucket size sufficient to ensure that no fluid spills over the top, i.e., no data is lost. In terms of IP traffic analysis, analogy to the bucket model leads to the prediction that, for a given amount of traffic (fluid) and a sufficiently large amount of memory (bucket), any traffic pattern (drain rate out the hole) can be forced to be regular. Although, memory is often not large enough in IPsec encryption devices, modest increases in memory capacity can be used to make the IP traffic dramatically more regular. By reshaping the IP traffic to be more regular, traffic analysis becomes more difficult, because all network connections will appear to operate at the same basic frequency.

Figure 7:
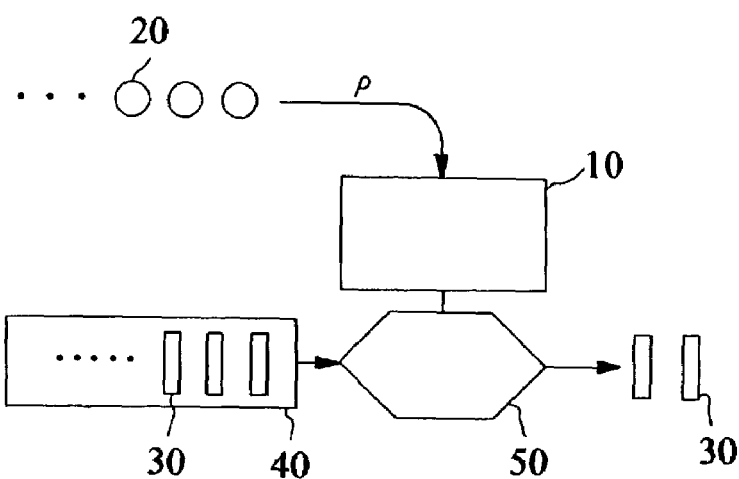
FIG. 7 is a diagram illustrating a token bucket scheme.

The pattern or shape of communication traffic has a considerable impact on the network that carries the traffic. In general, current known traffic shaping schemes are variants of a single shaping scheme known as the token bucket scheme. FIG. 7 illustrates a token bucket 10. Credits 20, which correspond to rights to send a certain amount of data, are placed in the bucket 10 at a rate ρ. Arriving packets of data 30 are placed in a queue 40, waiting to be sent. A packet is removed from the queue 40 and transmitted by a regulator 50, or valve, when there are enough credits 20 in the bucket 10.

Figure 8:
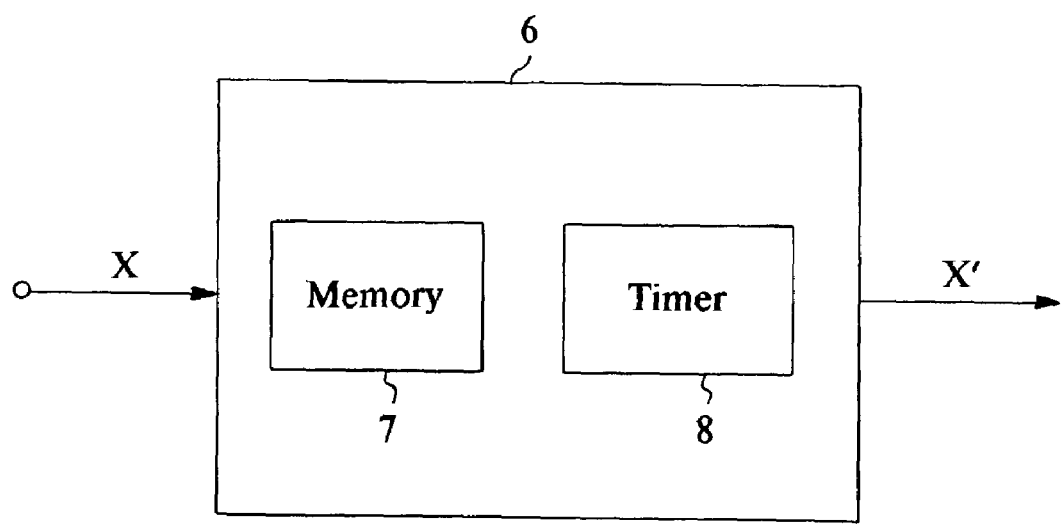
FIG. 8 schematically shows an apparatus for reshaping communication traffic.

An example of how a token bucket scheme may be implemented in a communication network is shown in FIG. 8. Aggregated IP traffic X, made up of packets of data, arrives at a network link 6. The network link 6 temporarily stores the packets in a memory 7. The packets are released from the memory 7 one by one, when a timer 8 of the network link 6 determines that sufficient time has elapsed from when a previous packet was released. Accordingly, the IP traffic X' leaving the network link 6 will reveal minimal information about the individual communicating parties, because the IP traffic X' has been reshaped to reveal little to no information from analysis of its packet arrival rate at a subsequent network link.

The types of token buckets that can be used to reshape traffic into various patterns number at least several hundred. The two extreme cases are correspond to a large bucket/fast rate and a small bucket/modest rate. A large token bucket, which holds a large number of credits and which has a very fast credit supply rate, will rarely, if ever, reshape traffic. This is because every arriving packet finds enough credits in the bucket immediately or shortly thereafter, as the bucket rapidly fills with credits, and is quickly transmitted. A small token bucket, which holds only one credit, for example, and which has a modest credit supply rate will typically space packets out at regular or nearly regular intervals equal to the inverse of the credit supply rate.

The ability of token buckets to make packet transmissions look regular can be used to shape IP traffic, to make it less vulnerable to passive attacks, such as passive attacks by the signal analysis techniques discussed above. An increase in the regularity of IP traffic results in a decrease in the appearance of distinct peaks in the cepstra calculated from the IP traffic, thus resulting in a decrease in the detectability of particular communications.

Depending on a particular IP traffic pattern, which can be determined using the signal analysis techniques discussed above, a number of different token bucket parameters can be varied to re-shape that traffic pattern. In addition, by using a series of token buckets, IP traffic may be further smoothed, thus further decreasing the presence of detectable peaks.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

As will be appreciated, many different types of network communication systems can utilize the features of the present invention. The inventive methods can also be embodied on computer-executable code that is stored on a computer-readable medium, for example, a floppy disk, a hard drive, removable media, an optical memory, a magneto-optical memory, a RAM, a ROM, a flash memory, so-called "memory sticks," and the like.

What is claimed is:

1. A method of analyzing aggregated signals in network communications, said method comprising the steps of:

obtaining a trace of communication traffic through a network link, the trace corresponding to arrival times of at least a first packet stream and a second packet stream simultaneously passing through the network link, with the first and second packet streams respectively corresponding to first and second communications; and performing spectral analysis on the trace to identify periodic components in at least one of the first and second packet streams.

2. The method according to claim 1, wherein the trace is a trace of Internet Protocol traffic.

3. The method according to claim 1, wherein the first packet stream corresponds to a bulk data transfer through the network link, and the second packet stream corresponds to an interactive communication between parties through the network link.

4. The method according to claim 1, wherein the first and second packet streams are encrypted according to IPsec standards.

5. The method according to claim 1, wherein the spectral analysis performed on the trace is cepstral analysis.

6. The method according to claim 5, wherein the cepstral analysis identifies a periodicity in arrival-time data of packets corresponding to at least one of the first and second packet streams.

7. The method according to claim 6, wherein the arrival-time data is used to determine a communication party corresponding to at least one of the first and second communications.

8. A method of detecting patterns in network communications, said method comprising the steps of:
obtaining a trace of communication traffic through a network link, the trace corresponding to arrival times of packet data; and
performing wavelet analysis on the trace to identify one or more of the patterns in the trace.

9. A method of detecting patterns in network communications, said method comprising the steps of:
obtaining a trace of communication traffic through a network link, the trace corresponding to arrival times of packet data; and
performing wavelet analysis on the trace to identify one or more of the patterns in the trace,
wherein the wavelet analysis includes:
determining a continuous spectral transform or a discrete spectral transform of the trace to obtain a determined transform,
selecting a wavelet function and a set of scales to analyze the determined transform,
determining a normalized wavelet function for each scale in the set,
determining a wavelet transform for each scale,
minimizing an effect of edge-effect errors, and
determining confidence regions for each scale as a function of time.

10. A method of classifying shapes in network communications, said method comprising the steps of:
obtaining a trace of communication traffic through a network link, the trace corresponding to a time-dependent composite signal;
detecting shapes in the trace; and
differentiating between the shapes in the trace by training statistical models on a data set of a shape of the trace, comparing a training score for each of the statistical models with one another, and classifying the shape according to a statistical model with a highest training score.

11. The method according to claim 10, wherein the training is performed using Hidden Markov Models.

12. The method according to claim 10, wherein said detecting step is performed using a Neyman-Pearson Lemma analysis.

13. An apparatus for analyzing aggregated signals in a trace of communication traffic through a network link, the trace corresponding to arrival times of at least a first packet stream and a second packet stream simultaneously passing through the network link, with the first and second packet streams respectively corresponding to first and second communications, said apparatus comprising:
a spectrum analyzer adapted to perform spectral analysis on the trace to identify periodic components in at least one of the first and second packet streams.

14. The apparatus according to claim 13, wherein the trace is a trace of Internet Protocol traffic.

15. The apparatus according to claim 13, wherein the first packet stream corresponds to a bulk data transfer through the network link, and the second packet stream corresponds to an interactive communication between parties through the network link.

16. The apparatus according to claim 13, wherein the first and second packet streams are encrypted according to IPsec standards.

17. The apparatus according to claim 13, wherein the spectral analysis performed on the trace is cepstral analysis.

18. The apparatus according to claim 17, wherein the cepstral analysis identifies a periodicity of arrival-time data of packets corresponding to at least one of the first and second packet streams.

19. The apparatus according to claim 18, wherein the arrival-time data is used to determine a communication party corresponding to at least one of the first and second communications.

20. An apparatus for detecting patterns in a trace of communication traffic through a network link, the trace corresponding to arrival times of packet data, said apparatus comprising an analyzer adapted to perform wavelet analysis on the trace to identify one or more patterns in the trace.

21. An apparatus for detecting patterns in a trace of communication traffic through a network link, the trace corresponding to arrival times of packet data, said apparatus comprising an analyzer adapted to perform wavelet analysis on the trace to identify one or more patterns in the trace, wherein said analyzer includes:
a transform unit adapted to determine a continuous spectral transform or a discrete spectral transform of the trace,
a selection unit adapted to select a wavelet function and a set of scales to analyze the determined transform,
a normalization unit adapted to normalize a wavelet function for each scale,
a wavelet transform unit adapted to determine a wavelet transform for each scale,
an error minimization unit adapted to minimize an effect of edge-effect errors, and
a confidence unit adapted to determine confidence regions for each scale as a function of time.

22. An apparatus for differentiating shapes in a trace of communication traffic through a network link, the trace corresponding to a time-dependent composite signal, said apparatus comprising:
a detection unit adapted to detect shapes in the trace; and
a differentiation unit adapted to differentiate between the shapes in the trace by training statistical models on a data set of a shape of the trace, comparing a training score for each of the statistical models with one another, and classifying the shape according to a statistical model with a highest training score.

23. The apparatus according to claim 22, wherein said differentiation unit performs training using Hidden Markov Models.

24. The apparatus according to claim 22, wherein said detection unit detects the shapes in the trace by performing a Neyman-Pearson Lemma analysis.

25. A programmable computer for use in analyzing aggregated signals in network communications, said programmable computer comprising:

a memory that includes at least one region adapted to store computer executable program code; and a processor adapted to execute the program code stored in said memory, wherein the program code includes code for performing spectral analysis on a trace of communication traffic through a network link, the trace corresponding to arrival times of at least a first packet stream and a second packet stream simultaneously passing through the network link, with the first and second packet streams respectively correspond to first and second communications, and wherein the spectral analysis identifies periodic components in at least one of the first and second packet streams corresponding to the first and second communications.

26. A programmable computer for use in detecting patterns in network communications, said programmable computer comprising:

a memory that includes at least one region adapted to store computer executable program code; and a processor adapted to execute the program code stored in said memory, wherein the program code includes code for performing wavelet analysis on a trace of communication traffic through a network link to identify one or more patterns in the trace, with the trace corresponding to arrival times of packet data of the network communications.

27. A programmable computer for use in detecting patterns in network communications, said programmable computer comprising:

a memory that includes at least one region adapted to store computer executable program code; and a processor adapted to execute the program code stored in said memory, wherein the program code includes code for performing wavelet analysis on a trace of communication traffic through a network link to identify one or more patterns in the trace, with the trace corresponding to arrival times of packet data of the network communications, and wherein the wavelet analysis includes:
determining a continuous spectral transform or a discrete spectral transform of the trace,
selecting a wavelet function and a set of scales to analyze the determined transform,
determining a normalized wavelet function for each scale,
determining a wavelet transform for each scale,
minimizing an effect of edge-effect errors, and
determining confidence regions for each scale as a function of time.

28. A programmable computer for use in detecting shapes in network communications, said programmable computer comprising:

a memory that includes at least one region adapted to store computer executable program code; and a processor adapted to execute the program code stored in said memory, wherein the program code includes:
code for detecting shapes in a trace of communication traffic through a network link, the trace corresponding to a time-dependent composite signal; and
code for differentiating between the shapes in the trace by training statistical models on a data set of a shape of the trace, comparing a training score for each of the statistical models with one another, and classifying the shape according to a statistical model with a highest training score.

29. A computer-executable program stored on a computer-readable medium, said program for analyzing aggregated signals in network communications, said program comprising:

code for performing spectral analysis on a trace of communication traffic through a network link, the trace corresponding to arrival times of at least a first packet stream and a second packet stream simultaneously passing through the network link, with the first and second packet streams respectively corresponding to first and second communications, wherein the spectral analysis identifies periodic components in at least one of the first and second packet streams corresponding to the fist and second communications.

30. A computer-executable program stored on a computer-readable medium, said program for detecting patterns in network communications, said program comprising:

code for performing wavelet analysis on a trace of communication traffic through a network link, the trace corresponding to arrival times of packet data, wherein the wavelet analysis identifies one or more patterns from the trace.

31. A computer-executable program stored on a computer-readable medium, said program for detecting patterns in network communications, said program comprising:

code for performing wavelet analysis on a trace of communication traffic through a network link to identify one or more patterns from the trace, the trace corresponding to arrival times of packet data, wherein the wavelet analysis includes:
determining a continuous spectral transform or a discrete spectral transform of the trace,
selecting a wavelet function and a set of scales to analyze the determined transform,
determining a normalized wavelet function for each scale,
determining a wavelet transform for each scale,
minimizing an effect of edge-effect errors, and
determining confidence regions for each scale as a function of time.

32. A computer-executable program stored on a computer-readable medium, said program for detecting shapes in network communications, said program comprising:

code for detecting shapes in a trace of communication traffic through a network link, the trace corresponding to a time-dependent composite signal; and
code for differentiating between the shapes in the trace by training statistical models on a data set of a shape of the trace, comparing a training score for each of the statistical models with one another, and classifying the shape according to a statistical model with a highest training score.

33. An apparatus for analyzing aggregated signals in a trace of communication traffic through a network link, the trace corresponding to arrival times of at least a first packet stream and a second packet stream simultaneously passing through the network link, with the first and second packet streams respectively corresponding to first and second communications, said apparatus comprising:

spectrum analysis means adapted to perform spectral analysis on the trace to identify periodic components in at least one of the first and second packet streams corresponding to the first and second communications.

34. An apparatus for detecting patterns a trace of communication traffic through a network link, the trace corresponding to arrival times of packet data, said apparatus comprising:
means for performing wavelet analysis on the trace to identify periodic components in the trace.

35. An apparatus for detecting patterns a trace of communication traffic through a network link, the trace corresponding to arrival times of packet data, said apparatus comprising:
analysis means for performing wavelet analysis on the trace to identify periodic components in the trace, wherein said analysis means includes:
first transform means for determining a continuous spectral transform or a discrete spectral transform of the trace,
selection means for selecting a wavelet function and a set of scales to analyze the determined transform,
normalization means for normalizing a wavelet function for each scale,
second transform means for determining a wavelet transform for each scale,
error minimization means for minimizing an effect of edge-effect errors, and
confidence determination means for determining confidence regions for each scale as a function of time.

36. An apparatus for detecting shapes in a trace of communication traffic through a network link, the trace corresponding to a time-dependent composite signal, said apparatus comprising:
detection means for detecting shapes in the trace; and
differentiation means for differentiating between the shapes in the trace by training statistical models on a data set of a shape of the trace, comparing a training score for each of the statistical models with one another, and classifying the shape according to a statistical model with a highest training score.

* * * * *